Patented Mar. 7, 1939

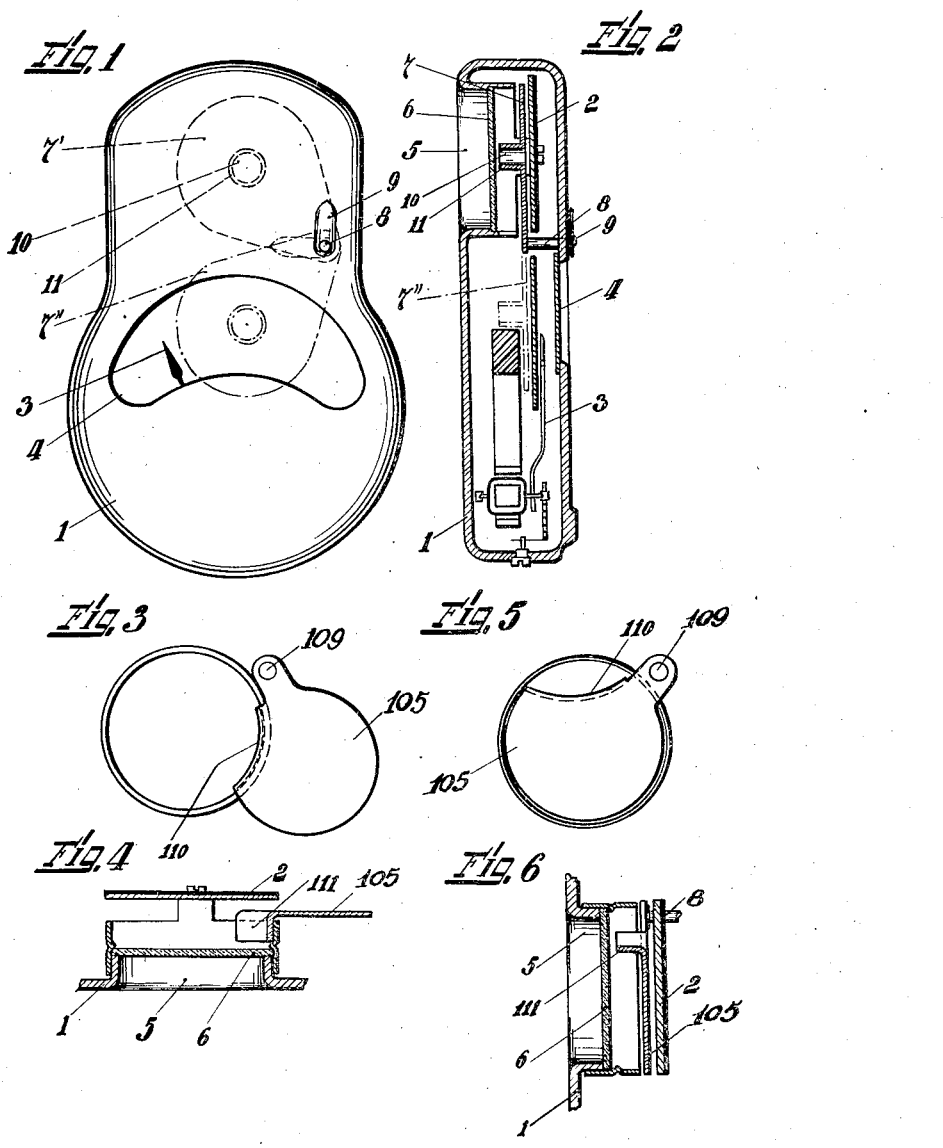

2,150,047

UNITED STATES PATENT OFFICE 2,150,047

PHOTOELECTRIC EXPOSURE METER

Albrecht Bernhard and Guido Beyrich, Nuremberg, Germany, assignors to Metrawatt Aktiengesellschaft, Fabrik Elektrischer Messgeraete, a German company Application August 28, 1936, Serial No. 98,396
In Germany August 31, 1935

5 Claims. (Cl. 88—23)

The present invention relates to a photo-electric exposure meter of the type comprising a photo-electric element and a direct current measuring instrument. The usually employed apparatus of this kind are fitted with a rotatable diaphragm, adapted to be moved in the front of the element in the case of great intensity of light and by means of which a part of the sensitive surface of the element is covered, which effects a change of the range of measurement of the apparatus.

It is an object of the invention, to arrange the diaphragm in such a way, that the movement of the diaphragm in the front of the element effects not only the covering of a part of the sensitive surface of the element, but causes also a reduction of the angle of incidence of the light rays, i. e. a reduction of the picture-angle. Commonly the picture-angle of such exposure meters is very much greater than the same angle of a camera. The diaphragm according to the invention however enables to reduce the said angle of the apparatus in such extent that its size approaches the picture-angle of an ordinary camera. By this the influence of the lateral and upper rays, which effects considerable faults of measurement in the case of a great intensity of light, is eliminated.

To this purpose the rotatable diaphragm according to the invention is formed with a passage and fitted with a projecting border, which surrounds said passage completely or partly. In a preferred embodiment of the invention the passage in the diaphragm is situated near or on the outer circumference of the surface of the diaphragm.

Further objects of the invention will be apparent from the description as it proceeds.

In order that the invention may be more clearly understood some embodiments thereof are described hereinafter with reference to the accompanying drawing in which:

Fig. 1 is a front view and

Fig. 2 a longitudinal cross-sectional view of a photo-electric exposure meter;

Fig. 3 is a front view of a modified form of the diaphragm in the opened or inoperative position;

Fig. 4 is a horizontal sectional view of the modified form of diaphragm according to Fig. 3 in the opened or inoperative position, the photo-electric element and the adjacent part of the casing;

Fig. 5 is a front view of the modified form of diaphragm according to Fig. 3 in the closed or operative position;

Fig. 6 is a vertical sectional view of the modified form of diaphragm according to Fig. 3 in the closed or operative position, the photo-electric element and the adjacent part of the casing.

The photo-electric exposure meter shown in Figures 1 and 2 comprises a photo-electric element 2 of the form having a flat surface and a direct current measuring instrument arranged in a common casing 1. The pointer 3 of the direct current measuring instrument is visible through an aperture 4 formed in the front wall of casing 1. The photo-electric element 2 is exposed to the light through a window or opening 5 above the aperture 4 and which is preferably provided by an inwardly extending tubular portion of the rear wall of casing 1. The window 5 is closed by a protective glass disk 6. In the interior of the apparatus there is arranged a vertically disposed disk-shaped diaphragm 7 which is supported by a rearwardly extending rotatable shaft 8, one end of which extends through the front wall of the casing 1. The shaft 8 has a suitable manipulating arm 9 therefor arranged outside of the casing. The diaphragm 7 is so disposed relative to element 2 as to be capable of being shifted to a position forwardly of and to a position below element 2. The shaft 8 is secured to the back of diaphragm 7 in close proximity to its edge. By means of said manipulating arm 9 the diaphragm 7 can be turned either into what may be termed closed or operative position indicated at 7' or into an open or inoperative position indicated at 7''. The operative position of diaphragm 7 is when the latter is arranged in forward relation with respect to element 2 and the inoperative position of diaphragm 7 is when the latter is arranged completely below element 2. In the first case the whole sensitive surface of the element 2 is covered, with the exception of that part thereof, which is exposed to the light through a circular passage 10 formed in and centrally of the diaphragm 7. In the second case the whole sensitive surface of the element 2 is exposed to the light.

In order to decrease simultaneously the picture-angle in the first case the diaphragm 7 is provided with a forward extension constituting what may be termed a projecting border for the passage 10. The inner face of border 11 is flush with the edge or wall of passage 10. The border 11 is disposed at right angles to the front of the diaphragm.

In the form shown in Figures 3 to 6, the diaphragm is indicated at 105 and it is provided with an ear 109 to which shaft 8 is attached. The diaphragm 105 is not provided with the axial passage 10, such as formed in diaphragm 7. The diaphragm 105 on its outer circumference is provided with a segmental-shaped cut-out to form a passage 110. Diaphragm 105 is also formed with what may be termed a projecting border 111 consisting of a forwardly directed flange flush with the edge or wall of the cut-out and disposed at right angles to the plane of the diaphragm. Preferably the passage 110 is disposed on the upper part of the circumference of the diaphragm. The border 111 serves simultaneously as a stop in the opening movement of the diaphragm 108. The passage 110 of the diaphragm 108 has the form of a segment. The disposition of the passage 110 on the outer circumference of the surface of the diaphragm 108 according to Figures 3 to 6 effects a reduction of the picture-angle apart from the same effect of the projecting border 111.

Of course further modifications of the constructional examples described may be made without departing from the scope of the invention.

Having now described the nature of our invention and in what manner the same may be performed, what we claim is:—

1. A photo-electric exposure meter comprising a photo-electric element, a direct current measuring instrument, a housing for said element and instrument, and a bodily shiftable diaphragm for alteration of the range of measurement, said diaphragm being pivotally mounted in said housing and adapted to be shifted alternatively to a position in front of or aside from the sensitive surface of said element, said diaphragm being formed with a passage and a border forming means corresponding in contour to and disposed at the edge of said passage, said means projecting at right angles to the plane of said diaphragm.

2. The invention as set forth in claim 1 having said passage and means of circular form.

3. A photo-electric exposure meter comprising a photo-electric element, a direct current measuring instrument, a housing for said element and instrument, and a bodily shiftable diaphragm for alteration of the range of measurement, said diaphragm being pivotally mounted in said housing and adapted to be shifted alternatively to a position in front of or aside from the sensitive surface of said element, said diaphragm being formed with a passage and a border forming means in the form of a rim disposed at the edge of said passage, projecting at right angles to the plane of said diaphragm and adapted to stop the movement of the diaphragm in the turned-off position.

4. A photo-electric exposure meter according to claim 3 having said passage and said rim extending inward from the edge of the diaphragm.

5. The invention as set forth in claim 3 having said passage and means of segmental contour.

ALBRECHT BERNHARD.
GUIDO BEYRICH.